United States Patent [19]

Tucker

[11] 4,396,917
[45] Aug. 2, 1983

[54] COUNTERMEASURES SYSTEM

[75] Inventor: Trevor W. Tucker, Ottawa, Canada

[73] Assignee: Her Majesty the Queen in right of Canada, as represented by the Minister of National Defence of Her Majesty's Canadian Government, Ottawa, Canada

[21] Appl. No.: 924,446

[22] Filed: Jul. 6, 1978

[30] Foreign Application Priority Data

Mar. 30, 1978 [CA] Canada .................................. 299991

[51] Int. Cl.³ .............................................. G01S 7/38
[52] U.S. Cl. .................................. 343/18 E; 343/6.8 R
[58] Field of Search .......................... 343/18 E, 6.8 R; 325/11

[56] References Cited

U.S. PATENT DOCUMENTS 2,978,699  4/1961  Dodington .................. 343/18 E
4,083,004  4/1978  Cohn .......................... 343/6.8 R X Primary Examiner—T. H. Tubbesing
Attorney, Agent, or Firm—William R. Hinds

[57] ABSTRACT

Known electronic countermeasures systems have difficulty handling some modern radar signals, for example frequency agile, frequency sliding or frequency coded signals. The invention disclosed overcomes the problems of the prior art by using an analog frequency dividing system to virtually instantaneously down-convert received signals in octave steps and in octave stages into the frequency regimes associated with the operation of processing devices, such as analog to digital converters, digital logic devices, surface acoustic wave devices, and charge coupled devices. Those processed signals which are selected for retransmission, perhaps in a modified form, are then up-converted into the region of the received signal by the appropriate number of stages of frequency multipliers. Any modification in such signal parameters as signal duration, delay, frequency, phase, power, amplitude or spectral content may be incorporated prior to the first multiplication stage, between multiplication stages, after the last multiplication stage, or any combination of the above.

5 Claims, 4 Drawing Figures

COUNTERMEASURES SYSTEM

This invention relates to electronic countermeasures systems.

In electronic countermeasures, the problem is to receive and analyse microwave signals and, when the analysis deems it appropriate, to generate and transmit signals which have a selected and often critical relationship to the received signals. While the following description is framed in terms of an electronic countermeasures application, the technique described may also be applied to radar or communications repeaters or transponders.

As will be discussed in more detail later in this description, known electronic countermeasures systems are not satisfactory. In the case of some modern radar signals, for example frequency agile, frequency sliding or frequency coded signals, there is a growing requirement to analyse the intrapulse frequency content of individual pulses. State of the art digital circuits do not operate fast enough to do this analysis directly in real-time microwave signals. In many present day countermeasures systems problems are also encountered with tuning and component failures.

The present invention utilizes analog microwave frequency dividing devices, in single or multiple cascaded stages to virtually instantaneously down-convert received signals in octave steps and in octave stages into the frequency regimes associated with the operation of processing devices, such as, for examples: analog to digital converters, digital logic devices, surface acoustic wave devices, and charge coupled devices. Those processed signals which are selected for retransmission, perhaps in a modified form, are then up-converted into the region of the received signal by the appropriate number of stages of frequency multipliers. Any modification in such signal parameters as, for example: signal duration, delay, frequency, phase, power, amplitude or spectral content may be incorporated prior to the first multiplication stage, between multiplication stages, after the last multiplication stage, or any combination of the above.

Thus, in accordance with the present invention, there is provided an electronic countermeasures system comprising means for receiving transmitted microwave signals and feeding them to an analog microwave frequency divider system having n stages, where n is an integer, each stage dividing frequencies applied to it by a factor of 2, said frequency divider having an output feeding a processor adapted to determine if transmission of a signal from the countermeasures system is required and, if so, manipulating the divided frequencies and feeding them to a frequency multiplier system and techniques generator for subsequent retransmission.

The invention will now be described further in conjunction with the accompanying drawings, in which.

Figure 1:
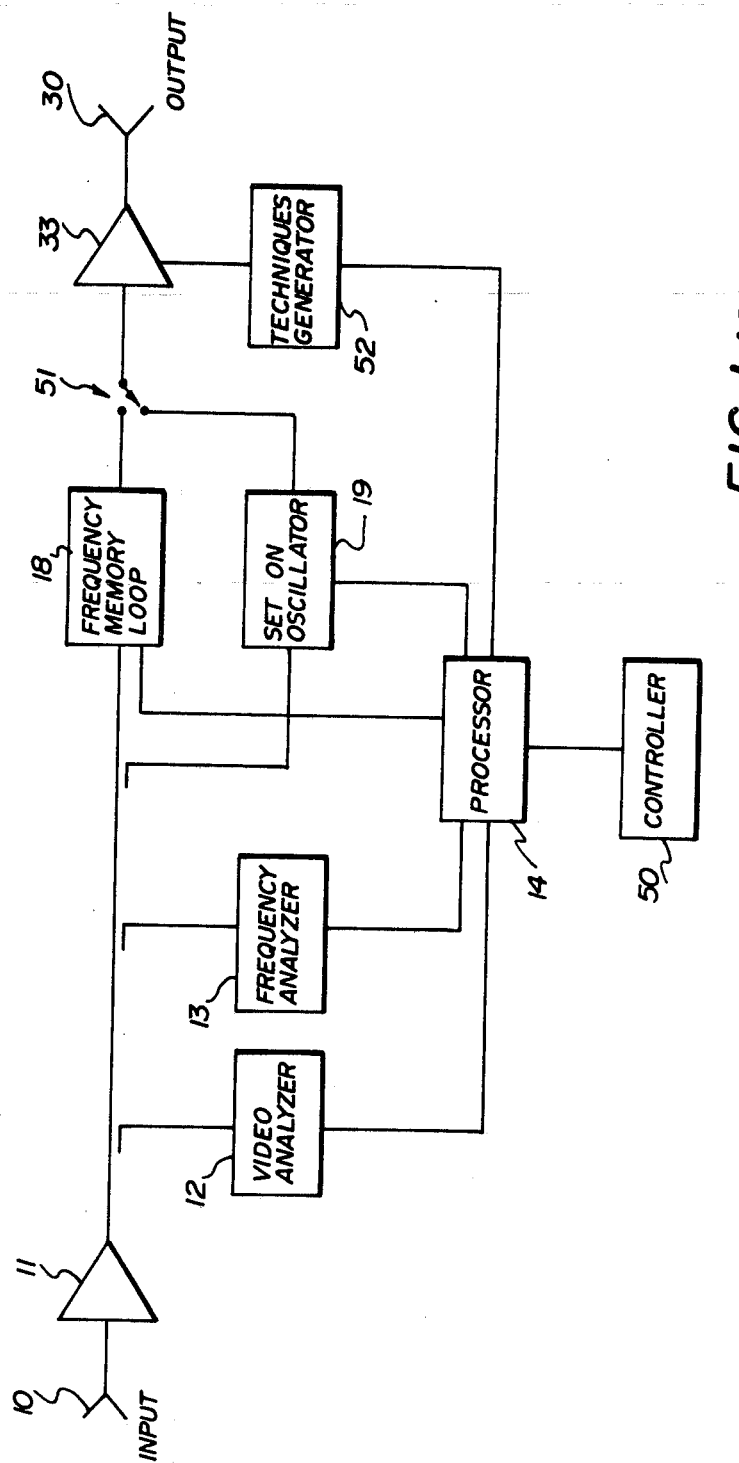
FIG. 1 is a block diagram of a prior art type of electronic countermeasures system.

The block diagram of FIG. 1 is a simplified but basic configuration of a typical known electronic countermeasures system. The operation of this system will now be briefly described.

A signal is received at the input port 10 and amplified by amplifier 11 after which it is analysed by a video analyser unit 12 and a frequency analyser unit 13. These analyses are typically based on such signal parameters as frequency, bearing, pulse width, pulse repetition interval, scan rate and scan pattern. The outputs from the analysers 12 and 13 are then processed further in the processor unit 14 to determine if the transmission of a signal from the output 30 of the countermeasures system is appropriate. A human operator interacts with the processor (and the system as a whole) by means of the controller 50.

The function of the frequency memory-loop 18 is to very quickly memorize and retain, for a short period of time, the frequencies of selected signals. The function of the set-on oscillator 19 is to memorize the frequencies of selected signals, (rather more slowly than the memory-loop) but to retain those frequencies for longer periods of time. The frequencies of the selected signals which are memorized by either the memory-loop 18 or the set-on oscillator 19 are then available for retransmission, perhaps in a modulated or modified form.

The function of the techniques generator 52 is to generate modulation waveforms which may be applied to the memorized signal, in order to obtain the desired output signal. Such modulation may be imposed on the memorized signal by way of an output amplifier stage 33, by way of the set-on oscillator 19 or the frequency memory-loop 18 or by way of some additional modulator. A switch 51 allows selection of either the frequency memory-loop 18 or the set-on oscillator 19.

In the cases of those signals for which the generation of a response signal output is appropriate, the processor and/or operator may select the appropriate combination and settings of the frequency memory-loop 18, the set-on oscillator 19 and the techniques generator 52 to generate and transmit a signal of the desired form. This transmitted signal may bear a critical relationship to the received signal in terms of such parameters as (but not restricted to) frequency, delay time, duration, amplitude, phase and spectral content.

The video analyser 12, the processor 14 and the controller 50 would in most modern countermeasures systems, consist of solid-state analog and/or digital processing circuits, analog to digital converters and display devices such as light emitting diodes, plasma displays or cathode ray tubes.

The frequency analyser 13 in modern systems would, in most cases, utilize either sweeping heterodyne or frequency discriminator circuits for frequency measurement. A few systems may utilize contiguous filter banks or microsweeping, compressive heterodyne circuits for frequency analysis.

The frequency memory-loop 18 usually consists of solid-state or travelling wave tube amplifiers with either waveguide, coaxial or solid-state acoustic delay lines comprising a feed-back loop around the amplifiers. Also included in this loop may be gain and/or phase equalization devices.

The set-on oscillator unit 19 would usually include either a backward wave oscillator or a varactor or yig-tuned solid-state oscillator together with supporting analog and/or digital circuitry.

The techniques generator 52 would usually consist of solid-state analog and/or digital devices, and in some cases electron beam devices such as electron beam semiconductor modulators or high voltage vacuum tubes.

The limitations of the typical countermeasures system depicted in FIG. 1 which are of concern are:

(i) Frequency analysis: In the case of some modern radar signals (for example; frequency agile, frequency sliding or frequency coded signals) there is a growing requirement to analyse the intrapulse frequency content of individual pulses. State-of-the-art digital circuits do not operate fast enough to do this analysis directly in real-time on microwave signals (i.e. digital circuits do not yet operate at the microwave frequencies of most radars of concern). The indirect methods, such as heterodyning, or frequency discriminating, suffer the deficiencies of low frequency resolution and/or low probability of detection when applied to single pulses.

(ii) Frequency Memory-Loop: Memory-loops are normally characterized by short memory times (2 to 5 $\mu$sec), by considerable phase (and frequency) degradation of the memorized signal and by an increase in random noise content in the signal as a function of memory time. These latter two properties are particularly undesirable for memorizing coherent signals, such as those generated by doppler or pulse compression radars. In addition, the tuning of the gain and phase equalization circuits in the memory-loop are very critical to achieving adequate memory over broad frequency ranges. Even a small change in the amplifier's or delay-line's characteristics as a function of time or temperature can give rise to intolerable degradation in the performance of the memory-loop. Travelling wave tube memory-loops are particularly sensitive to such degradation, and in addition, their mean-time betwen failure is relatively high in comparison to solid-state or digital devices.

(iii) Set-on Oscillator: The primary problems of the set-on oscillator unit are the set-on time required and the post-timing drift of the oscillator. The fastest tuning devices are the varactor tuned solid-state oscillators which typically may be tuned at rates of 1 GHz/$\mu$ second. Such tuning rates are in most cases too slow to capture single radar pulses which typically may be 500 nanoseconds and in special cases may be as short as 100 nanoseconds.

The present invention utilizes analog microwave frequency dividing devices, in single or multiple cascaded stages to virtually instantaneously down-convert received signals in octave steps and in octave stages into the frequency regimes associated with the operation of processing devices, such as, for examples: analog to digital converters, digital logic devices, surface acoustic wave devices, and charge coupled devices. Those processed signals which are selected for retransmission, perhaps in a modified form, are then up-converted into the region of the received signal by the appropriate number of stages of frequency multipliers. Any modification in such signal parameters as, for example: signal duration, delay, frequency, phase, power, amplitude or spectral content may be incorporated in a processor prior to the first multiplication stage, between multiplication stages, after the last multiplication stage, or any combination of the above.

Figure 2:
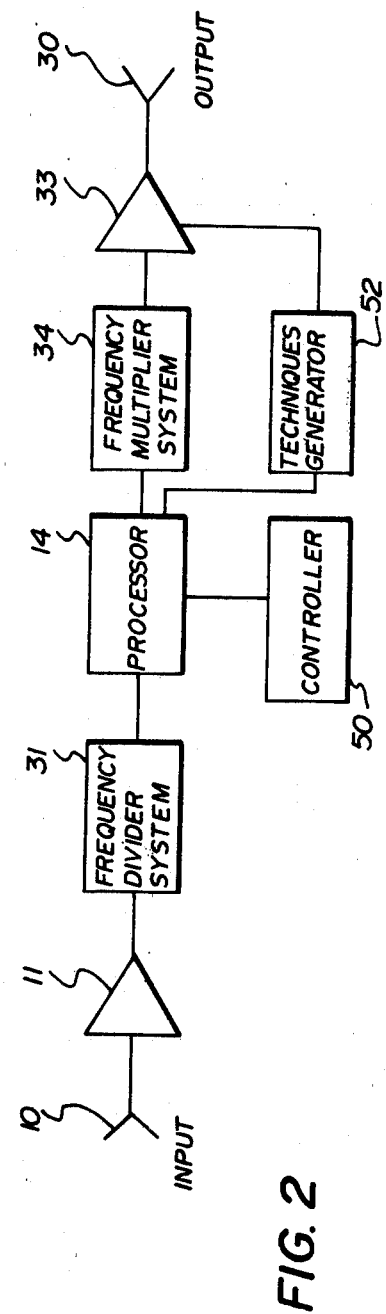
FIG. 2 is a block diagram of one embodiment according to the present invention.
Figure 3:
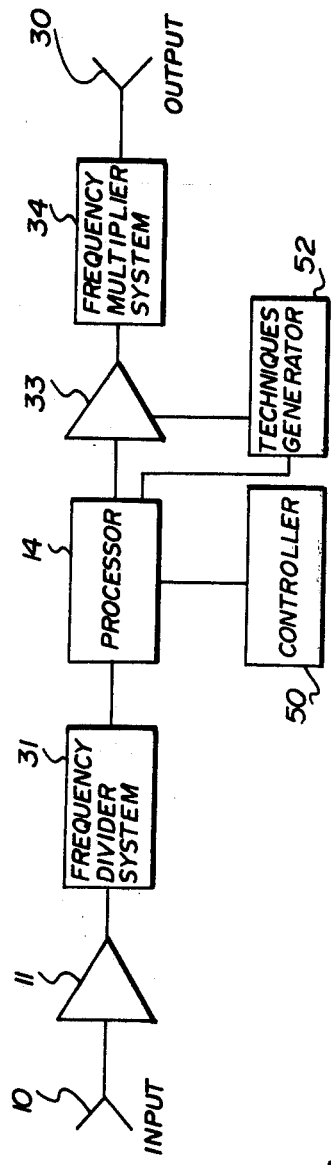
FIG. 3 is a block diagram of a second embodiment of the present invention.

Two typical configurations for countermeasures systems utilizing frequency division are shown in FIGS. 2 and 3.

In both FIGS. 2 and 3, a signal at input 10 passes through an amplifier 11 to a frequency divider system 31, the frequency divider system comprising one or a number of cascaded stages, a detailed diagram of a single stage being shown in FIG. 4 to be described subsequently.

In FIG. 2, the output of frequency divider system 31 passes to processor 14 which again has connected to it a controller 50. The processor is connected to a techniques generator 52 which has an output connected to an amplifier and/or a modulating device 33, the output of which passes to output port 30, such as an antenna. It is to be noted, however, that the signals from processor 14 pass through a frequency multiplier system 34 which up-converts signals applied to it into the region of the received signal at input port 10. Thus frequency multiplier system 34 could have the same number of stages as frequency divider system 31, although in some cases this may not be necessary. That is, it might be desired to have the output frequencies somewhat different from the input frequencies.

The system shown in FIG. 3 differs from that shown in FIG. 2 only in that the techniques generator 52 and amplifier/modulator unit 33 precede the frequency multiplier system 34. That is, the amplifier/modulator unit 33 acts on the signals before they are up-converted.

Figure 4:
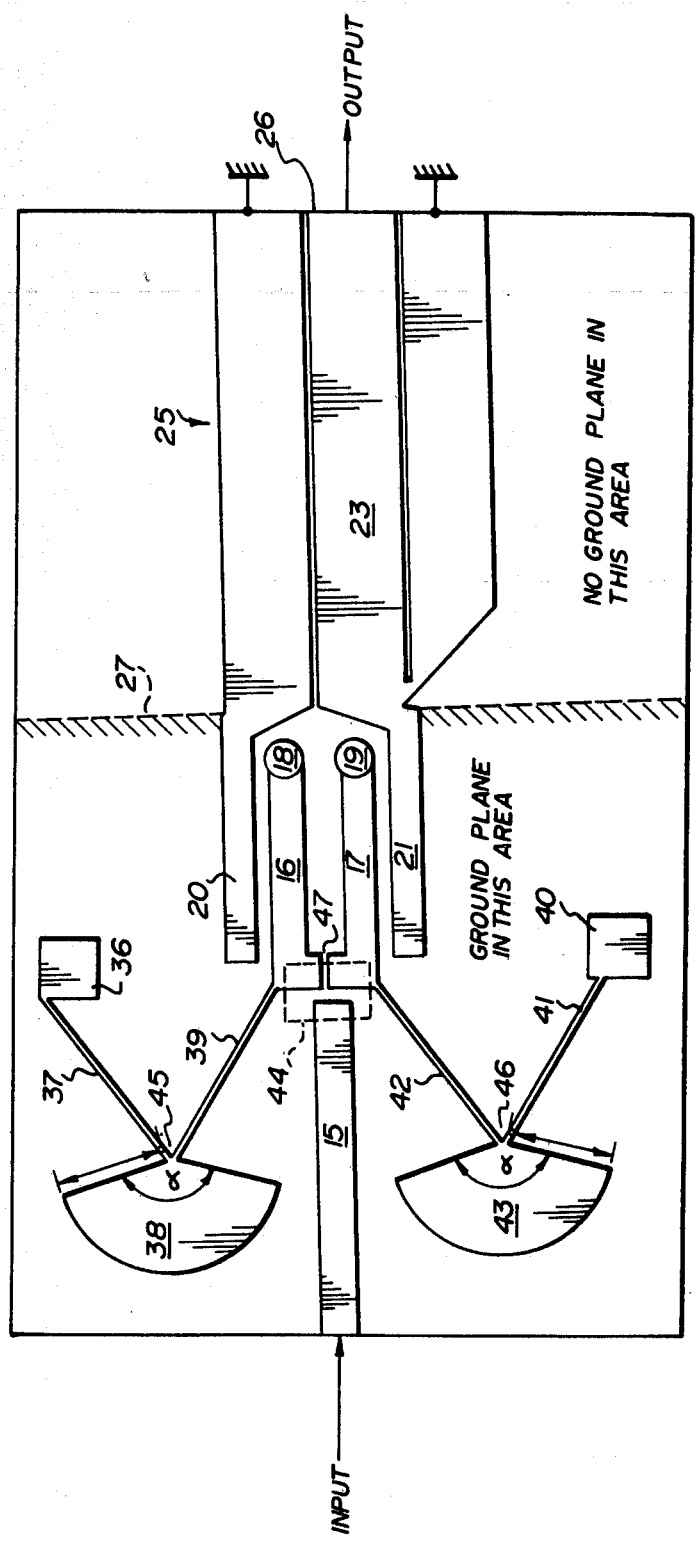
FIG. 4 is a diagram of an analog frequency divider which may be used in the frequency divider systems of FIGS. 2 and 3.

FIG. 4 shows one stage of the analog frequency divider system. The analog frequency divider system has n stages, where n is an integer (including 1), each stage dividing frequencies applied to it by a factor of 2.

Referring to FIG. 4, a microwave frequency signal at the input of frequency $f_1$ appears at the output as a signal of frequency $f_1/2$. A number of frequency dividers according to FIG. 4 may be connected in cascade with intermediate amplifiers if necessary. Each stage divides the signal at its input by 2 so that if there are n stages, the ultimate output signal has a frequency of $\frac{1}{2}^n$ of the input frequency.

FIG. 4 is, except for some reference numerals, identical to FIG. 8 of Canadian patent application Ser. No. 264,358, filed Oct. 28, 1976 and subsequently issued as Canadian Pat. No. 1,041,614 of Oct. 31, 1978, in the name of Her Majesty the Queen in Right of Canada as represented by the Minister of National Defence and entitled "Broadband Frequency Divider Using Microwave Varactors". Reference may be had to that application for a more detailed discussion of the analog frequency divider although sufficient disclosure is included here for understanding of the present invention.

The frequency divider, which operates in the microwave frequency range, employs strip line or microstrip transmission lines, balanced varactor diodes and a coplanar balun. The divider consists essentially of a basic resonant circuit which has two or more transmission lines, each such line being terminated with a varactor diode at one end of the line. The lines are electrically connected or electromagnetically coupled at the other end. The diodes are selected so as to be matched. Means are provided for introducing a signal to the basic resonant circuit and for extracting an output signal from the circuit. Strip lines, microstrip lines, varactor diodes and baluns are all known in the art and need not be explained here.

Referring to FIG. 4, the microstrip transmission line 15 carries an input electrical signal to microstrip transmission lines 16 and 17 through DC blocking chip capacitor 44 which is located between the microstrip line 15 and lines 16 and 17. At microwave frequencies, capacitor 44 is a short circuit.

Lines 16 and 17 are terminated with varactors 18 and 19. One terminal of each varactor is connected to an end of one of the transmission lines 16 and 17 and the other terminal is grounded by connection to the metallic ground plane of the microstrip transmission lines. It will be understood, of course, that the ground plane is on the underside of the device shown in FIG. 4 which is a top plan view.

The circuit comprising lines 16 and 17 and varactors 18 and 19 forms a basic resonant circuit which supports oscillation at $\frac{1}{2}$ of the frequency appearing on input line 15 if the input signal on line 15 is approximately sinusoidal and if the length of lines 16 and 17 is appropriately chosen for the frequencies involved. The circuit is broadband in nature. For example, if the input signal contains frequency components ranging from 5-10 GHz and a desired output frequency range of 2.5-5 GHz were desired, then the circuit parameters would be chosen using the upper output frequency of 5 GHz as the approximate basic resonant frequency. (This is a small-signal resonant frequency). In summary, lines 16 and 17 and varactors 18 and 19 act in combination to form a sub-harmonic frequency generator with a balanced output signal.

The purpose of the balun 25 and coupling microstrip transmission lines 20 and 21 is to extract an output signal from the basic resonant circuit. Although FIG. 4 is here being discussed in terms of microstrip lines, it will be understood that strip lines and perhaps other types of lines may be used instead.

Open circuited microstrip transmission lines 20 and 21 are located adjacent to lines 16 and 17 of the basic resonant circuit and so a signal is induced by electromagnetic coupling into lines 20 and 21 from lines 16 and 17. The balanced signal appearing on lines 20 and 21 is conveyed to balun 25 and then to line 26 where it appears as an unbalanced output signal.

The significant result is the conversion of the balanced signal of a given input frequency to an unbalanced signal of an output frequency equal to half the input frequency. Ordinary care should be taken in the location and dimensioning of the circuit components, so that unwanted resonance and interference effects, etc., do not arise.

There is no ground plane in the balun section which lies to the right of line 27.

The generation of sub-harmonic frequencies is a result of the well known specific non-linear nature of the varactors 18 and 19 in the basic resonant circuit.

In general, the length of lines 16 and 17 will correspond to an electrical length somewhat less than ($\lambda/4$) at resonance frequency. Routine experimentation may be used to determine appropriate dimensions. However, the device shown in FIG. 2 was designed to accommodate an input frequency range of 8.5 to 9.5 GHz. The microstrip line 15 may be used as an input matching transformer, in which case its impedance will be different from the normal 50 ohms and its length will be ($\lambda/4$) at or near the center of the input band of frequencies. Further, capacitor 44 may be chosen to partially annul the inductive part of the input impedance. The input impedance of the basic resonant circuit looks inductive because the input frequency is in general higher than the resonance frequency.

DC bias is applied to the matched pair of varactors 18 and 19 by way of pads 36 and 40 which consist of layers of conducting material placed upon the surface of the substrate layers. The substrate may be alumina. An individual source of DC voltage may be applied to each pad or a common source may be applied to both pads 36 and 40. In either case, one terminal of a DC source is connected to (say) pad 36 and the other terminal of the DC source is connected to the ground conductive layer. Radial transmission lines 38 and 43 at operational microwave frequencies have zero or very small input impedances at points 45 and 46. Such radial or "half-moon" lines are discussed and partially analyzed by D. A. Syrett in a Master of Engineering Thesis at Carleton University in Ottawa, Canada, January, 1973, entitled "The Use of the Automatic Network Analyzer in the Development and Modelling of a Novel Broadband Bias Line for X-Band Microstrip Circuits". The optimum value of angle $\alpha$ is 150°. This value was not found by Syrett. The radius "r" of the "half-moon" lines is approximately a quarter of a wave length at the center frequency of the input band of frequencies. Transmission lines 37, 39, 41 and 42 have a physical length which is also $\frac{1}{4}$ of a wave length at the center frequency of the input band of frequencies. So, at point 47, the impedance looking back at radial lines 38 and 43 is substantially that of an open circuit or infinity. The impedance of the bias circuit at the output frequencies is irrelevant because, at resonance, point 47 is a virtual ground.

Two biasing circuits are provided to (1) preserve the overall symmetry of the device and (2) permit independent biasing of the two varactors to optimize the balance if necessary. In case (2), two separate blocking capacitors 44 would be used, one from 15 to 16, the other from 15 to 17. The electrical length of the co-planar balun is chosen to be $\lambda/4$ at the center of the output band of frequencies.

As shown in FIG. 4, the entire microstrip and co-planar balun circuit is intentionally skewed with respect to its substrate. This permits the input and output connectors to transmission line 15 and output point 26, being one end of arm 23 of the balun, to be located on the center line of a metal enclosure box which holds the entire device.

The resonance frequency $f_o$ of the device increases as the reverse DC bias is increased. This is because the average capacitance of the varactor changes with the bias voltage, as is known. The DC bias may be zero volts, although a DC return is required in order to present the varactors being charged and hence changing their capacitance.

For proper operation, the input power should be 15 dBm or greater.

It is believed that the foregoing description of FIG. 4 is sufficient to understand the present invention. For a more detailed explanation of the theory and operation and the frequency divider, reference should be had to the aforementioned Canadian patent application.

Although the preferred embodiment has been described above as utilizing a particular form of microwave frequency divider it is expected that other types of microwave frequency dividers will be developed which would also function satisfactorily in apparatus according to the present invention.

The embodiments of the invention in which an exclusive property or privilege is claimed are defined as follows:

1. An electronic countermeasures system comprising means for receiving transmitted microwave signals and feeding them to a non-heterodyning analog microwave frequency divider system having n stages, where n is an integer, each stage dividing frequencies applied to it by a factor of 2, said frequency divider system having an output feeding a processor adapted to determine if transmission of a signal from the countermeasures system is required and, if so, feeding the divided frequencies to a frequency multiplier system and techniques generator for subsequent retransmission.

2. An electronic countermeasures system as claimed in claim 1 wherein said frequency multiplier has n stages.

3. An electronic countermeasures system as claimed in claim 2 wherein said techniques generator comprises means for modulating the divided frequencies.

4. An electronic countermeasures system as claimed in claim 2 wherein said techniques generator comprises means for modulating signals at the output of the frequency multiplier system.

5. An electronic countermeasures system as claimed in claim 1, 3 or 4 wherein said microwave frequency divider comprises (a) an even number of matched microwave varactor diodes, each of said diodes having a unique first terminal and a unique second terminal; (b) a plurality of terminated microstrip transmission lines equal in number to the number of diodes, each of said plurality of terminated microstrip transmission lines comprising a first conductor and a second conductor, one end of the first conductor and one end of the second conductor defining a first end of the said last mentioned transmission line, and the other end of the first conductor and the other end of the second conductor defining a second end of the last mentioned microstrip transmission line, a unique one of each of said diodes terminating said second end of a corresponding unique one of said transmission lines by connecting said first conductor at said second end to said first terminal of said diode and connecting said second conductor at said second end to said second terminal of said diode; (c) an input microstrip transmission line coupled to said first end of all of said plurality of terminated transmission lines for conveying an input signal to said plurality of transmission lins; (d) a balun electromagnetically coupled to said plurality of microstrip transmission lines, said balun transforming a balanced signal from said plurality of microstrip transmission lines into an unbalanced output signal; (e) microstrip means positioned in the vicinity of said plurality of transmission lines and electromagnetically coupled therewith and electrically connected to said balun for conveying a signal from said plurality of lines to said balun.

* * * * *